No. 662,848.  
E. G. WOOD.  
CYCLE FRAME JOINT.  
(Application filed Dec. 23, 1898.)

Patented Nov. 27, 1900.

(No Model.)

Witnesses  
Donald C. Muhleman,  
Geo. P. Kingsbury.

Inventor  
Edward G. Wood,  
by Mason, Fenwick & Lawrence,  
his Attys.

THE NORRIS PETERS CO., PHOTO-LITHO., WASHINGTON, D. C.

United States Patent Office.

EDWARD G. WOOD, OF LIVERPOOL, ENGLAND.

CYCLE-FRAME JOINT.

SPECIFICATION forming part of Letters Patent No. 662,848, dated November 27, 1900.

Application filed December 23, 1898. Serial No. 700,134. (No model.)

*To all whom it may concern:*

Be it known that I, EDWARD GREATBATCH WOOD, a subject of the Queen of Great Britain, residing at Liverpool, in the county of Lancaster, England, have invented certain new and useful Improvements in Cycle-Frame Joints, of which the following is a specification.

This invention relates to joints for the tubular frames of cycles and other vehicles, and has for its object an easy method of building up cycle and other frames without brazing or employing the application of heat in any form and which, moreover, allows of the various parts being finished before building up, while the completed frame is considerably stronger than those constructed by the ordinary or well-known method of brazing the parts together.

In carrying out the invention as applied to cycle-frames I unite the tubes of the frame by means of sockets or unions. These receive the ends of the tubes and in some cases are split, so that they can be contracted and closed around the tubes and by means of a binding device, to be hereinafter described, are united firmly together.

Figure 1:
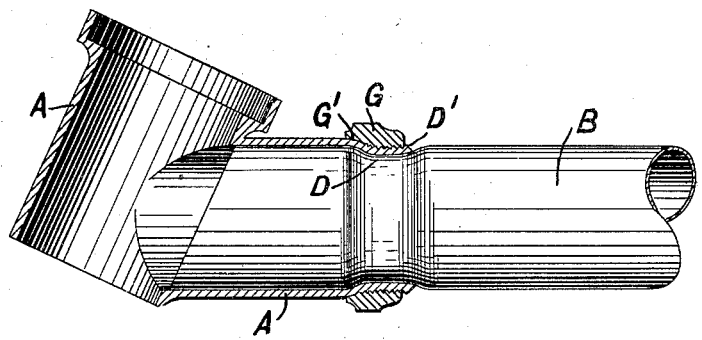
Figure 2:
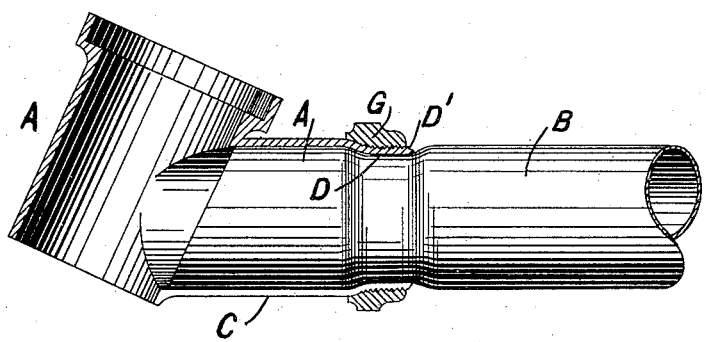

Referring to the accompanying drawings, Figure 1 is a vertical section of a portion of the steering-head, showing one method of uniting the tubes to the sockets. Fig. 2 is a vertical section of a similar portion of the frame to Fig. 1, showing another method of uniting the tubes of the socket; and Fig. 3 is an underneath plan view of the same.

It will be observed that the figures show the invention applied to the steering-head of a cycle-frame; but it must be understood that it can be applied to any or all of the tubular connections.

Referring first to Fig. 1, A is the socket to which the tube B is united. The tube B is first inserted in the socket A, and then the socket and tube together are cold-pressed into the shape shown in Fig. 1, a depression D being thereby formed in the tube B and a corresponding depression D' in the socket A. A screw-thread is then cut in the outer surface of the depression in the socket A and a nut G is screwed thereon, the front part G' of the nut being cone-shaped, so that as it is tightened against the end of the depressed part it exerts a pressure thereon, causing the socket A to grip the tube B more tightly. By this means a firm joint is made without the necessity of brazing.

Figure 3:
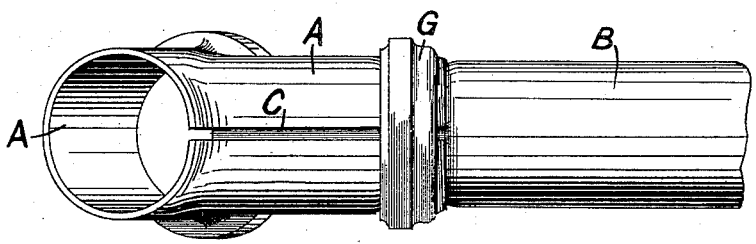

In the arrangement shown in Figs. 2 and 3 the socket B is split at C. In other respects this construction is the same as that shown in Fig. 1. The advantage of this method of splitting the outer tube or socket is that the parts A and B may be readily separated, if so desired, by unscrewing the nut G from off the socket and then exerting a pull on the part B, thereby causing the socket A to enlarge its diameter, widening the split C, and allowing the end of the tube B to pass through the depressed portion D' of the socket. As in the previous instance, the coned part G' of the nut G when screwed up presses against the edge of the depression D' in the socket and tightens it into the depression D in the tube, thereby forming a rigid joint which, however, is capable of being taken to pieces when so desired—for example, for convenience in packing or to replace a faulty tube—as it is evident that this construction can be applied to all the tubes of a cycle or similar frame, thereby rendering the operation of brazing unnecessary and making the parts of the whole frame easily separable, so that any ordinary person could take the frame to pieces. In Figs. 2 and 3 of the accompanying drawings only one split C is shown; but it is evident that two or more splits could be made in the socket without departing from the spirit of my invention.

I declare that what I claim is—

1. A joint for cycles and other vehicles, comprising a socket and tube, a depression formed in the tube below the normal contour thereof, a reduced end formed on the socket and adapted to fit into said tube depression, screw-threads formed exteriorly of the said reduced portion, and a nut adapted to screw thereon, said nut having a coned inner surface at one end adapted to bear against the shoulder on the socket formed at the reduced portion, substantially as described.

2. A joint for cycles and other vehicles, comprising a split socket and a tube, a depression formed in the tube at a point intermediate its length, a reduced end formed on the socket made smooth inside and provided with threads on the outside, and a nut adapted to be screwed on said threads and against the shoulder formed by the reduced portion, the structure being such that the socket can be sprung over the end of the tube and its reduced end be brought into the depression of the tube for clamping, substantially as described.

In witness whereof I have hereunto signed my name this 10th day of December, 1898, in the presence of two subscribing witnesses.

EDWARD G. WOOD.

Witnesses:
G. C. DYMOND,
W. H. BEESTON.